(12) United States Patent
Pullen (10) Patent No.: US 9,917,779 B2
(45) Date of Patent: Mar. 13, 2018

(54) ALLEVIATING CONGESTION IN A CABLE MODEM

(75) Inventor: David Pullen, Buford, GA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 529 days.

(21) Appl. No.: 13/435,674

(22) Filed: Mar. 30, 2012

(65) Prior Publication Data
US 2013/0051225 A1    Feb. 28, 2013

Related U.S. Application Data

(60) Provisional application No. 61/526,504, filed on Aug. 23, 2011.

(51) Int. Cl.
| H04L 12/801 | (2013.01) |
| H04L 12/28 | (2006.01) |
| H04L 12/851 | (2013.01) |
| H04L 12/861 | (2013.01) |

(52) U.S. Cl.
CPC .......... H04L 47/12 (2013.01); H04L 12/2801 (2013.01); H04L 47/245 (2013.01); H04L 47/2441 (2013.01); H04L 49/9047 (2013.01)

(58) Field of Classification Search
CPC ......................... H04L 49/9063; H04L 49/901
USPC .... 370/235, 401, 389, 231, 395.5, 353, 392; 725/111
See application file for complete search history.

(56) References Cited

U.S. PATENT DOCUMENTS

| 6,839,355 | B1* | 1/2005 | Saby et al. .................... 370/401 |
| 7,620,055 | B1* | 11/2009 | Chandran et al. ......... 370/395.5 |
| 7,724,740 | B1* | 5/2010 | Wang et al. .................. 370/392 |
| 7,796,583 | B1* | 9/2010 | Enderby ........................ 370/353 |
| 7,899,052 | B1* | 3/2011 | Hao et al. ...................... 370/392 |
| 7,948,883 | B1 | 5/2011 | Croft, Jr. |
| 8,259,710 | B1* | 9/2012 | Enderby ........................ 370/353 |
| 2002/0129378 | A1* | 9/2002 | Cloonan et al. .............. 725/111 |
| 2003/0058795 | A1* | 3/2003 | Lansing et al. ............... 370/235 |
| 2006/0187930 | A1* | 8/2006 | Smith et al. ................... 370/392 |
| 2008/0095155 | A1* | 4/2008 | Danzig .......................... 370/389 |
| 2009/0010160 | A1* | 1/2009 | Tzeng et al. .................. 370/231 |
| 2011/0200048 | A1* | 8/2011 | Thi et al. ....................... 370/392 |

FOREIGN PATENT DOCUMENTS

WO    WO 2009154581 A1 * 12/2009 ............ H04W 28/24

OTHER PUBLICATIONS

European Search Report, dated Nov. 8, 2012, for EP Appl. No. 12005566.0, 4 pages.

* cited by examiner

Primary Examiner — Parth Patel
(74) Attorney, Agent, or Firm — Sterne, Kessler, Goldstein & Fox PLLC (57) ABSTRACT

A method, system and computer program product for ingress level filtering of packets is provided. The system includes a Media Access Control (MAC) and a buffer pool that includes buffers configured to store packets. The MAC includes a memory configured to store an incoming packet and an inspection engine coupled to the memory. The inspection engine is configured to parse the incoming packet to determine a priority level of the incoming packet, determine whether there is a buffer available in the buffer pool to store the incoming packet, and allocate a buffer in the buffer pool to store the incoming packet based on the priority level of the incoming packet.

20 Claims, 4 Drawing Sheets

ALLEVIATING CONGESTION IN A CABLE MODEM

CROSS-REFERENCE TO RELATED APPLICATIONS

This application claims the benefit of U.S. Provisional Application No. 61/526,504, filed Aug. 23, 2011, which is incorporated herein by reference in its entirety.

BACKGROUND OF THE INVENTION

Field of the Invention

The invention is generally related to alleviating congestion in a cable modem.

Background Art

Cable television (CATV) systems are no longer limited to only providing television programs to viewers. In addition, they provide internet access, and/or other services to consumers via signals transmitted to customer premises by optical fibers, coaxial and other cables and local radio channels, such as Wi-Fi, Bluetooth®, etc., all in contrast to traditional over-the-air radio wave broadcasting of television programming.

A CATV system may utilize Data Over Cable Service Interface Specification (DOCSIS) compliant equipment and protocols to carry out a transfer of information, such as video, audio, and/or data between one or more set-top devices and one or more cable modem termination systems (CMTS). The DOCSIS Specification generally refers to a group of specifications published by CableLabs® that define industry standards for CMTS, cable modems (CMs) and control for set-top devices. In part, the DOCSIS specification sets forth requirements and objectives for various aspects of cable modem systems including, but not limited to, operations support systems, management, data interfaces, network layer, data link layer, and physical layer transport for data over cable systems. The DOCSIS interface specification entitled "Data-Over-Cable Service Interface Specifications, DOCSIS 3.0, MAC and Upper Layer Protocols Interface Specification, CM-SP-MULPIv3.0-I16-110623" is incorporated by reference herein in its entirety.

A DOCSIS cable system includes two primary components: one or more cable modems at a customer premises, and a CMTS located at a headend. As used herein, the term "downstream" refers to the transfer of information in a direction from the CMTS to the cable modems. The term "upstream" refers to the transfer of information in a direction from cable modems to the CMTS.

However, typical cable modems do not prioritize incoming traffic. As a result, incoming packets with a higher priority may be discarded while lower priority packets are stored and processed.

BRIEF DESCRIPTION OF THE DRAWINGS/FIGURES

The accompanying drawings, which are included to provide a further understanding of the disclosure and are incorporated in and constitute a part of this specification, illustrate embodiments of the invention and together with the description serve to explain the principles of the invention. In the drawings.

The present invention will now be described with reference to the accompanying drawings. In the drawings, like reference numbers may indicate identical or functionally similar elements.

DETAILED DESCRIPTION OF THE INVENTION

While the present disclosure is described herein with reference to illustrative embodiments for particular applications, it should be understood that the disclosure is not limited thereto. Those skilled in the art with access to the teachings provided herein will recognize additional modifications, applications, and embodiments within the scope thereof and additional fields in which the disclosure would be of significant utility.

Figure 1:
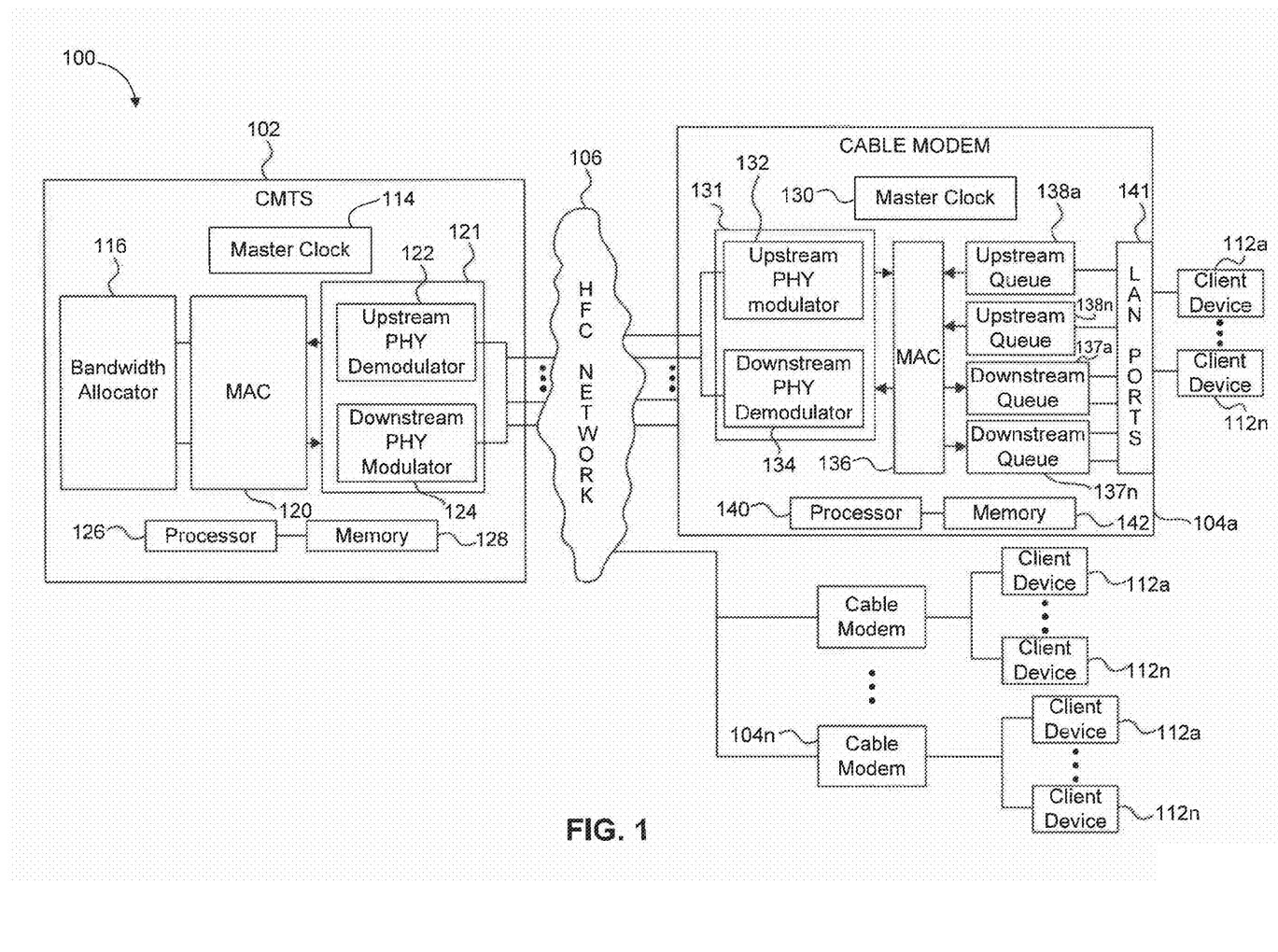
FIG. 1 illustrates an example communication system.

FIG. 1 illustrates an example system 100 according to an embodiment. System 100 includes a cable modem termination system (CMTS) 102 coupled to one or more cable modems (CMs) 104a-n via a HFC network 106. Each cable modem 104 may be coupled to one or more client devices 112a-n. In embodiments presented herein, "n" is an arbitrary positive integer.

CMTS 102 may include a media access controller (MAC) 120, and a physical layer (PHY) 121 that includes a downstream physical layer modulator (DS PHY) 124 and an upstream physical layer demodulator (US PHY) 122. CMTS 102 may also include a master clock 114 and a bandwidth allocator 116. In an embodiment, CMTS 102 may include a processor 126 coupled to a memory 128. The functions described herein as being performed by CMTS 102 may be performed by processor 126 based on instructions stored in memory 128. CMTS 102 is coupled to HFC network 106, which provides interconnectivity between CMTS 102 and cable modems 104. HFC network 106 supports wired, wireless, or both transmission media, including satellite, terrestrial (e.g., fiber optic, copper, twisted pair, coaxial, or the like), radio, microwave, free-space optics, and/or any other form or method of transmission. HFC network 106 may be any type of network including, but not limited to, the Internet or a wide area network (WAN). In an embodiment HFC network 106 is part of a DOCSIS network. It is to be appreciated that the type of network 106 is a design choice and may be arbitrary.

PHY 121 includes US PHY 122 and DS PHY 124. US PHY 122 forms the physical layer interface between CMTS 102 and the upstream channels of HFC network 106. CMTS 102 may include a separate US PHY 122 for each one of its upstream channels. US PHY 122 receives and demodulates all bursts from cable modems 104.

DS PHY 124 forms the physical layer interface between CMTS 102 and the downstream channel(s) of HFC network 106. Hence, video, voice, data and/or control messages that are destined for one or more cable modems 104 are collected at DS PHY 124 and transmitted to the respective cable modems 104. DS PHY 124 modulates and/or formats the information for downstream transmission.

MAC 120 receives the upstream signals from US PHY 122 and provides the downstream signals to DS PHY 124, as appropriate. MAC 120 operates as the lower sublayer of the data link layer of CMTS 102. In embodiments, MAC 120 supports fragmentation, concatenation, payload header suppression/expansion, and/or error checking for signals transported over the physical layer.

Memory 128 may interact with MAC 120 to store the signals as they are processed by MAC 120. Memory 128 may also store various auxiliary data used to support the processing activities. Such auxiliary data includes security protocols, identifiers, rules, policies etc.

Cable modem 104 may include a master clock 130, a physical layer (PHY) 131 that includes an upstream physical layer modulator (US PHY) 132, a downstream physical layer demodulator (DS PHY) 134. The US PHY 132 and the DS PHY 134 are coupled to MAC 136. MAC 136 is coupled to upstream queues 13a-n and downstream queues 137a-n. Upstream queues 138 store data for upstream transmission to cable modem termination system 102. Downstream queues 137 store data for downstream transmission to client devices 112a-n. Cable modem 104 also includes a processor 140 coupled to a memory 142. According to an embodiment of the disclosure, the functions described herein as performed by cable modem 104 may be performed by processor 140 based on instructions stored in memory 142. Cable modem 104 is coupled to HFC network 106 using methods of transmission including but not limited to wired, wireless, or both transmission media, including satellite, terrestrial (e.g., fiber optic, copper, twisted pair, coaxial, hybrid fiber-coaxial (HFC), or the like), radio, microwave, free-space optics, and/or any other form or method of transmission.

PHY 131 includes US PHY 132 and DS PHY 134. US PHY 132 forms the physical layer interface between the cable modem 104 and the upstream channels HFC network 106. Cable modem 102 may include a separate US PHY 132 for each one of its upstream channels. Video, voice, data and/or control messages that are destined for CMTS 102 are collected at US PHY 132 and transmitted to CMTS 102. US PHY 132 modulates and/or formats the information for upstream transmission to CMTS 102.

DS PHY 134 forms the physical layer interface between cable modem 104 and the downstream channel(s) of HFC network 106. DS PHY 134 receives and demodulates all bursts from CMTS 102.

MAC 136 receives the downstream signals from DS PHY 134 and provides the upstream signals to US PHY 132, as appropriate. MAC 136 operates as the lower sublayer of the data link layer for cable modem 104. In embodiments, MAC 136 supports fragmentation, concatenation, payload header suppression/expansion, and/or error checking for signals transported over the physical layer.

Memory 142 may interact with MAC 136 to store the signals as they are processed by MAC 136. Memory 142 may also store various auxiliary data used to support the processing activities. Such auxiliary data includes security protocols, identifiers, rules, policies etc.

A cable modem 104 may be coupled to one or more client devices 112a-n via Local Area Network (LAN) ports 141. A client device 112 maybe any electronic device that can be coupled to cable modem 104 for communication via LAN ports 141 including, but not limited to, for example, storage devices such as Universal Serial Bus (USB) drives, hard disk drives, flash memory drives, optical drives such as CD ROMs and DVD ROMs, WiFi devices such as wireless phones or Voice over Internet Protocol (VoIP) phones, devices that may utilize a LAN ports such as video game systems and wireless devices such as personal digital assistants (PDAs), smart phones such as iPhones™, wired or wireless tablet devices such as an iPad™. Client devices 112 may communicate amongst each other via LAN ports 141 and send and receive data from HFC network 106. In the present example, data or traffic received by a cable modem 104 from HFC network 106 (which includes data coming from CMTS 102 and the Internet) is referred to as Wide Area Network (WAN traffic herein. The data communicated amongst client devices 112a-n via LAN ports is referred to as Local Area Network (LAN) traffic herein. In an example, physical layer (PHY) 131 forms the physical layer interface for WAN traffic as well as LAN traffic.

A volume of WAN traffic or LAN traffic may be sufficiently high so as to cause congestion in the downstream direction. This congestion may lead to loss of high priority packets due to a lack of resources (such as memory or buffers) to store the high priority packets.

In an example, high priority traffic coming from HFC network 106 may be discarded because of excessive LAN traffic consuming all available resources. For example, a first client device 112a may be a hard disk drive and a second client device 112n may be a CD ROM. Data may be transferred from the CD ROM to the hard disk drive via LAN ports 141 thereby forming LAN traffic. At the same time there may be an incoming VoIP call coming in via HFC network 106. However, packets from the VoIP call may be dropped because of the existing traffic between the CD ROM drive and the hard disk drive consuming all available resources. Thus the high priority traffic such as the VoIP call does not receive the appropriate resources such as buffers and priority processing compared to low priority data transmission or LAN traffic in this example.

In another example, high priority packets from LAN traffic may be discarded due to a lack of resources. For example, a LAN voice call between a first client device 112a and a second client device 112n may be interrupted because of incoming data traffic (such as a file transfer protocol (FTP) download) from HFC network 106 which may be lower priority than the LAN voice call. In a further scenario there may be no LAN traffic, however low priority WAN traffic, such as data traffic, may consume all available resources resulting in high priority WAN traffic, such as a VoIP, call being discarded.

Such issues arise in conventional cable modems because determination of a priority level of incoming packets and the availability of resources to store higher priority incoming packets are not performed during the ingress of packets. Furthermore, incoming packets may not specify their priority level making ingress level filtering and advanced allocation of storage space more challenging. This results in high priority packets being possibly discarded in a congestion scenario. In addition, since incoming packets may not specify their priority level, these incoming packets may not get a processing priority commensurate with their priority level. What is needed is a system for ingress level processing of packets to determine a priority level of incoming packets, to determine sufficiency of resources to buffer the incoming packets based on their priority, to allocate resources for higher priority packets and to mark incoming packets with their respective priority level so that they receive a level of processing consistent with their priority level.

Figure 2:
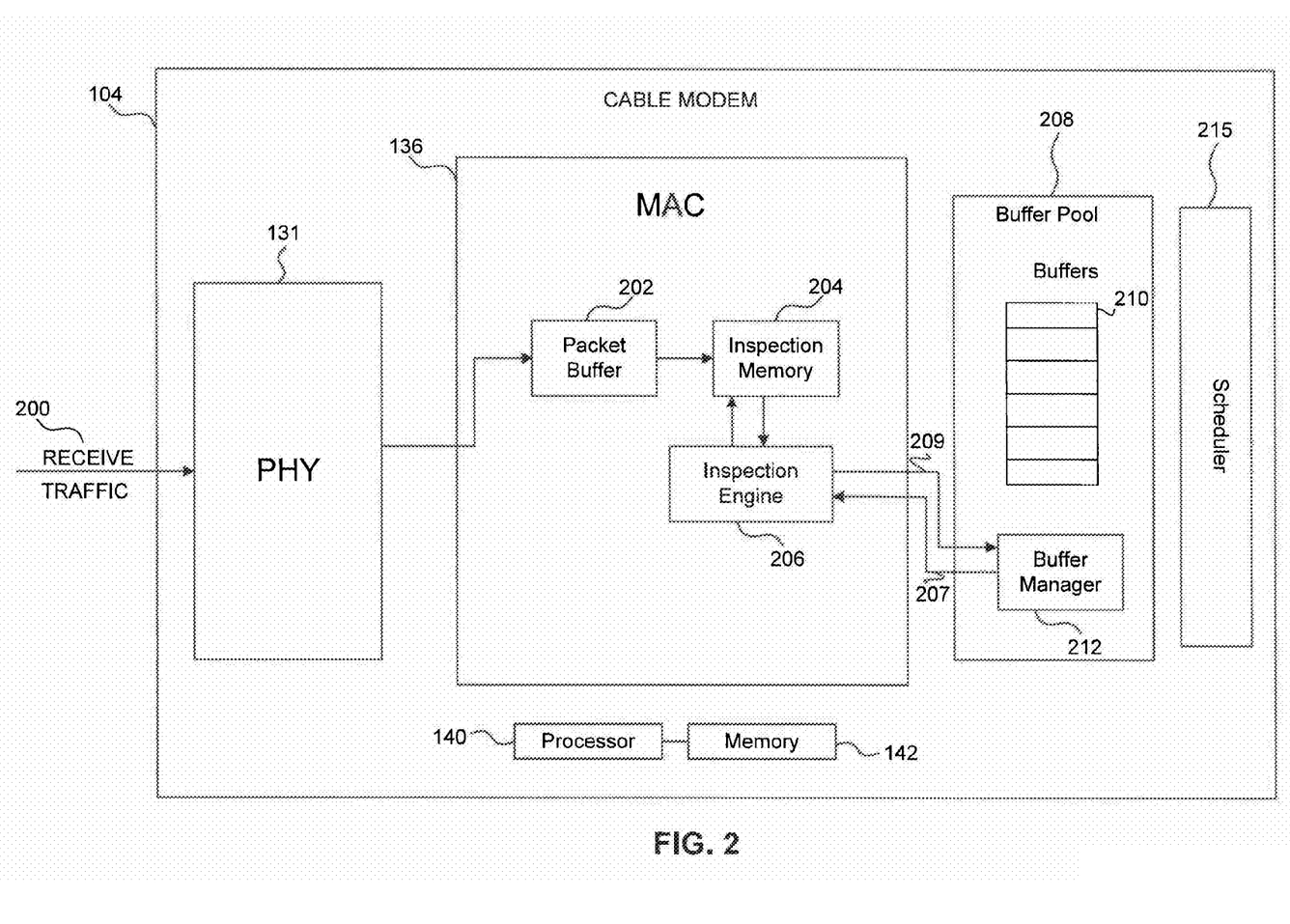
FIG. 2 illustrates an example cable modem with ingress level filtering capabilities according to an embodiment.

FIG. 2 illustrates an example cable modem 104 according to an embodiment. Cable modem 104 may include PHY 131, MAC 136, a buffer pool 208 and a scheduler 215. MAC 136 may include a packet buffer 202, an inspection memory 204 and an inspection engine 206. Buffer pool 208 includes buffers 210 and a buffer manager 212. The WAN traffic coming in from HFC network 106 and the LAN traffic from client devices 112a-n is collectively referred to as "receive traffic" 200 herein.

The embodiment shown in FIG. 2 provides ingress level filtering and prioritization of packets. An incoming packet in receive traffic 200 undergoes PHY level processing, such as concatenation of fragmented packets, cyclic redundancy checks (CRC) etc., in PHY 131. After PHY level processing, the packet is buffered in packet buffer 202. The packet is forwarded from packet buffer 202 to inspection memory 204 for inspection by inspection engine 206. Inspection memory 204 may be a random access memory (RAM) or a buffer large enough to hold a packet.

In an example, inspection engine 206 determines a priority level of a packet stored in inspection memory 204 by parsing the packet for at least one of an Internet Protocol version 4 (IPv4) or Internet Protocol version 6 (IPv6) source address or destination address; Transmission Control Protocol (TCP) or User Datagram Protocol (UDP) source port or destination port; Ethernet Media Access Control (MAC) address, Differentiated Services Code Point (DSCP) field in an Internet Protocol (IP) header, Virtual Local Area Network (VLAN), VLAN Identification (VID), and Type of Service (TOS) bits. At least one of the above fields of a packet are used by the inspection engine 206 to determine a priority level of the packet. For example, certain source or destination address fields may be associated with higher or lower priority traffic. The TOS bits in an IPv4 header may specify a datagram's priority level, which may require low-delay and high-throughput service. DSCP, also known as "Diff-Serv," can provide a coarse-grained mechanism for classifying and managing network traffic and providing Quality of Service (QoS) for IP traffic. DiffServ can, for example, be also used to indicate low-latency for critical network traffic such as voice or streaming media, and simple best-effort service for non-critical services such as web traffic or file transfers. Inspection engine 206 may utilize, for example, a lookup table that assigns priority levels to a packet based on one or more of the parsed fields described above.

"High priority" or "higher priority" traffic as referred to herein describes traffic that takes precedence over "low priority" or "lower priority" traffic. In an example, a priority level of a packet is determined based on a type of data associated with the packet. For example, VoIP packets may be classified as having higher priority than video packets which in turn may have higher priority than data packets. Conversely, priority levels may be programmed such that data packets are of a higher priority than VoIP packets which in turn may be higher priority than video packets. Thus, the priority levels are programmable and arbitrary based on implementation.

In a further example, packets may be prioritized based on a type of protocol in use. For example, TCP packets may be granted higher priority than UDP packets. In another example, all VoIP packets may be granted highest priority regardless of the protocol in use. In an embodiment, there may be multi-tiered priority determination based on a combination of characteristics such as a protocol, a Quality of Service (QoS) and/or a type of data associated with a packet. For example, all VoIP packets may be of high priority but the VoIP packets using the IPv6 protocol may have higher priority than the VoIP packets that are using the IPv4 protocol.

Inspection engine 206 also evaluates the availability of a buffer 210 in buffer pool 208 to store the incoming packet based on a queue status signal 207 from buffer manager 212. The queue status signal 207 indicates whether a buffer 210 is available to store the incoming packet. If there is a buffer available to store the packet then inspection engine 206 marks the packet with its priority level and stores it in a buffer 210. "Marking" or "tagging" as referred to herein refers to indicating the priority level of the packet by one or more of adding a tag to the packet, modifying a reserved or unused field in the packet or by modifying a field in the header of the packet. Marking or tagging packets may not modify the packet itself. For example, "out-of-band" marking or tagging where a message is associated with the packet but is not actually part of the packet data, may indicate a priority level of a packet without actually modifying the packet. Marking or tagging the priority level provides filtering for the packet consistent with its priority level. For example, scheduler 215 may drop lower priority packets or expedite the processing of higher priority packets. It is to be appreciated that a manner in which a packet is marked or tagged is a design choice and may be arbitrary.

If the queue status signal 207 indicates that there is no buffer 210 available, or if a number of available buffers is below a threshold, then inspection engine makes decisions based on the determined priority level of the packet. For example, if the packet is a high priority packet then inspection engine 206 sends a signal 209 to eject a low priority from one of the buffers 210 and stores the higher priority packet in the freed buffer. In another example, if there are no buffers available and the incoming packet is a low priority packet, then inspection engine 206 may drop the low priority packet. The term "eject" as referred to herein refers to vacating a buffer 210 by removing a packet from it. The ejected packet may be dropped by, for example, deleting the packet. In another example, the ejected packet may be stored in another memory (not shown) until packet congestion abates and there is a buffer 210 available to store the packet.

In an embodiment, there are only two levels of priority for a packet, high priority and low priority. In another embodiment, there may be multiple levels of priority that can be assigned to an incoming packet. Inspection engine may further tag each incoming packet whether it is a low priority packet or high priority packet prior to storing the packet in a buffer 210. Marking the priority level of the packet allows for priority level processing by cable modem 104. For example, based on the priority level marked by inspection engine 206, a packet may be given expedited processing or dropped in a congestion scenario.

In an example, the functions described as being performed by inspection engine 204 may be performed by processor 140 based on instructions stored in memory 142. In another example, the inspection engine may be based solely in hardware such as logic gates and circuits. In a further example, inspection engine 206 may be implemented as a combination of hardware and software.

Inspection engine 206 may be statically or dynamically programmable by CMTS 102 or a cable operator to specify the factors that are used to determine the priority level of an incoming packet. For example, inspection engine may be programmed to assign high priority to voice over IP packets and low priority to data traffic or LAN traffic. In another example, inspection engine 206 may be programmed by a user via a client device 112 to set the factors that determine a priority level of a packet. For example, inspection engine 206 may be programmed by a user via client device 112 (for example a personal computer) to assign high priority to a voice calls or real-time video traffic. In another example, cable modem 104 may configure itself based on instructions stored in memory 142 that specify the factors to determine a priority level of a packet.

Figure 3:
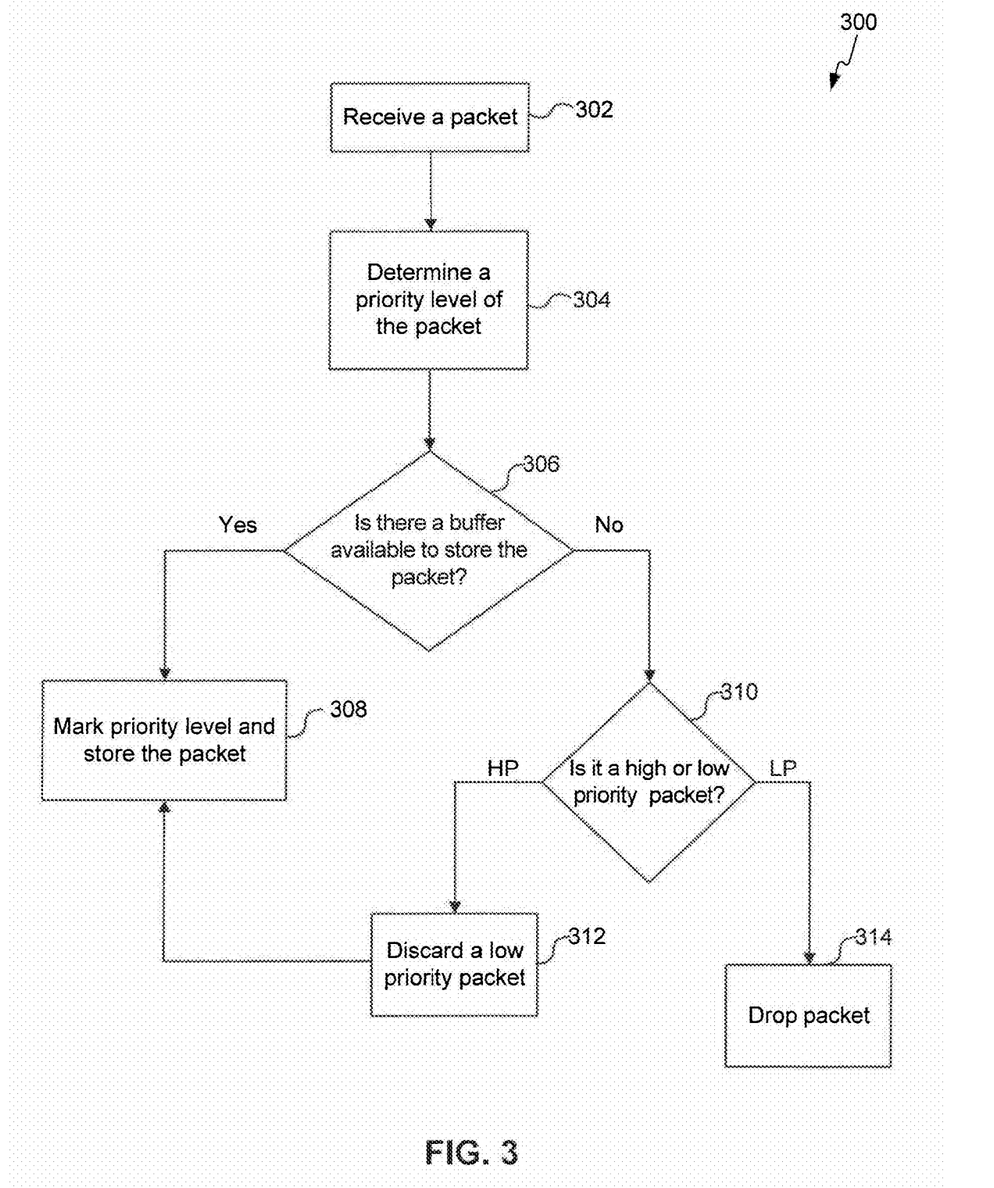
FIG. 3 illustrates an example flow chart illustrating steps performed for ingress level filtering of packets according to an embodiment.

FIG. 3 illustrates an example process 300 performed for ingress level filtering of packets according to an embodiment. Process 300 will be described with continued reference to the example operating environment depicted in FIGS. 1-2. However, the process is not limited to that embodiment. Note that some steps shown in process 300 do not necessarily have to occur in the order shown. In an example, the steps are performed by cable modem 104.

In step 302, a packet is received. For example, in step 302 a packet is received by cable modem 104 via PHY 131, buffered in packet buffer 202 and forwarded to inspection memory 204.

In step 304, a priority level of the packet is determined. For example, inspection engine 206, determines a priority level of an incoming packet by parsing contents of the packet stored in inspection memory 204.

In step 306, it is determined whether a buffer is available to store the packet. For example, it is determined whether a buffer 210 is available to store the incoming packet. If a buffer is available, then the process proceeds to step 308. If a buffer is not available, then the process proceeds to step 310.

In step 308, the priority level of the packet is marked for priority level filtering and the packet is stored in one or more buffers 210.

In step 310, it is determined whether the packet received in step 302 is a higher priority or lower priority packet. If the packet is a higher priority packet then the process proceeds to step 312. If the packet is a lower priority packet then the process proceeds to step 314.

In step 312, a signal is sent to eject a lower priority packet from a buffer. For example, inspection engine 206 sends a signal to buffer manager 212, to discard or eject a lower priority packet from a buffer 210. The process then proceeds to step 308 where the packet is marked to indicate its priority level and stored in the vacated buffer.

In step 314, the low priority may be dropped by deletion or stored in another memory until congestion reduces.

Example General Purpose Computer System

Embodiments presented herein, or portions thereof, can be implemented in hardware, firmware, software, and/or combinations thereof.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 4:
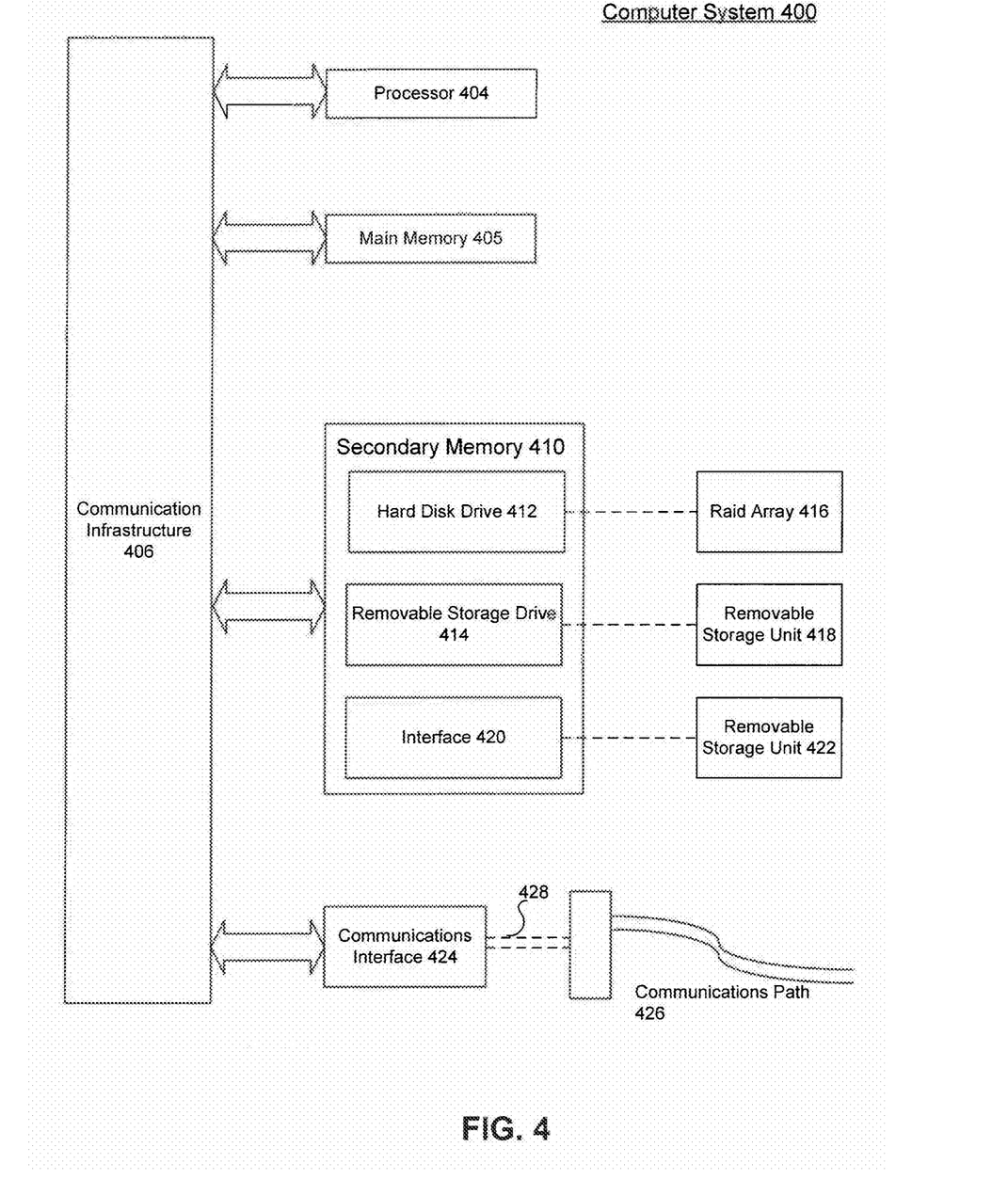
FIG. 4 is a block diagram of an exemplary computer system on which the present invention can be implemented.

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 400 is shown in FIG. 4. The computer system 400 includes one or more processors, such as processor 404. Processor 404 can be a special purpose or a general purpose digital signal processor. The processor 404 is connected to a communication infrastructure 406 (for example, a bus or network). Various software implementations are described in terms of this exemplary computer system. After reading this description, it will become apparent to a person skilled in the relevant art how to implement the disclosure using other computer systems and/or computer architectures.

Computer system 400 also includes a main memory 405, preferably random access memory (RAM), and may also include a secondary memory 410. The secondary memory 410 may include, for example, a hard disk drive 412, and/or a RAID array 416, and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, etc. As will be appreciated, the removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a PCM-CIA slot and card, etc. Software and data transferred via communications interface 424 are in the form of signals 428 which may be electronic, electromagnetic, optical or other signals capable of being received by communications interface 424. These signals 428 are provided to communications interface 424 via a communications path 426. Communications path 426 carries signals 428 and may be implemented using wire or cable, fiber optics, a phone line, a cellular phone link, an RF link and other communications channels.

The terms "computer program medium" and "computer usable medium" are used herein to generally refer to media such as removable storage drive 414, a hard disk installed in hard disk drive 412, and signals 428. These computer program products are means for providing software to computer system 400.

Computer programs (also called computer control logic) are stored in main memory 405 and/or secondary memory 410. Computer programs may also be received via communications interface 424. Such computer programs, when executed, enable the computer system 400 to implement the present disclosure as discussed herein. In particular, the computer programs, when executed, enable the processor 404 to implement the processes of the present disclosure. For example, when executed, the computer programs enable processor 404 to implement part of or all of the steps described above with reference to the flowcharts herein. Where the disclosure is implemented using software, the software may be stored in a computer program product and loaded into computer system 400 using raid array 416, removable storage drive 414, hard drive 412 or communications interface 424.

In other embodiments, features of the disclosure are implemented primarily in hardware using, for example, hardware components such as Application Specific Integrated Circuits (ASICs) and programmable or static gate arrays. Implementation of a hardware state machine so as to perform the functions described herein will also be apparent to persons skilled in the relevant art(s).

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A cable modem, comprising:
   a buffer pool, including a plurality of buffers, configured to store packets in the plurality of buffers;
   a Media Access Control (MAC) external to the buffer pool and coupled to the buffer pool, the MAC comprising:
      a memory configured to store an incoming packet; and
      an inspection engine coupled to the memory and configured:
         to be programmed remotely by a Cable Modem Termination System (CMTS) to determine a priority level of the incoming packet;
         to parse the incoming packet to determine the priority level of the incoming packet,
         to determine whether a buffer of the plurality of buffers is available to store the incoming packet, and
         to allocate the buffer to store the incoming packet based on the priority level of the incoming packet.

2. The cable modem of claim 1, wherein the buffer pool further comprises:
   a buffer manager configured to send a queue status signal to the inspection engine to indicate availability of the buffer.

3. The cable modem of claim 2, wherein the inspection engine is further configured to send a signal to discard a lower priority packet stored in the buffer if the incoming packet is a higher priority packet and the queue status signal indicates that no buffer in the plurality of buffers is available to store the higher priority packet.

4. The cable modem of claim 3, further comprising:
   a buffer manager configured to allocate the buffer to store the incoming packet based on the signal received from the inspection engine.

5. The cable modem of claim 2, wherein the inspection engine is further configured to discard the incoming priority packet when the incoming packet is a lower priority packet compared to a higher priority packet stored in the buffer and the queue status indicates that no buffer in the plurality of buffers is available to store the incoming packet.

6. The cable modem of claim 1, wherein the inspection engine is further configured to tag the incoming packet to indicate the priority level of the incoming packet prior to storing the incoming packet in the buffer.

7. The cable modem of claim 1, wherein the inspection engine is configured to parse the packet to determine at least one of an Internet Protocol version 4 (IPv4) or Internet Protocol version 6 (IPv6) source address or destination address; Transmission Control Protocol (TCP) or User Datagram Protocol (UDP) source port or destination port; Ethernet MAC address, Differentiated Services Code Point (DSCP) field in an Internet Protocol (IP) header, Virtual Local Area Network (VLAN), VLAN Identification (VID), and Type of Service (TOS) bits to determine the priority level of the incoming packet.

8. The cable modem of claim 1, wherein the inspection engine is configured to determine the priority level of the incoming packet based on a protocol associated with the incoming packet.

9. The cable modem of claim 1, wherein the inspection engine is configured to determine the priority level of the incoming packet based on a Quality of Service (QoS) associated with the incoming packet.

10. The cable modem of claim 1, wherein the inspection engine is configured to determine the priority level of the incoming packet based on a type of data associated with the incoming packet.

11. The cable modem of claim 1, wherein the inspection engine is configured to determine the priority level of the incoming packet based on a combination of a protocol associated with the incoming packet, a Quality of Service (QoS) associated with the incoming packet, and a type of data associated with the incoming packet.

12. The cable modem of claim 1, wherein the inspection engine is configured to be programmed by a client device, coupled to the cable modem, to determine the priority level of the incoming packet.

13. The cable modem of claim 1, wherein the inspection engine is configured to program itself based on instructions stored in the memory to determine the priority level of the incoming packet.

14. The cable modem of claim 1, further comprising: a downstream physical layer demodulator (DS PHY) coupled to the MAC and configured to receive the incoming packet and to forward the incoming packet to the MAC.

15. The cable modem of claim 1, wherein the inspection engine is instantiated in hardware.

16. The cable modem of claim 1, wherein the inspection engine is further configured to classify the incoming packet as a high priority packet when the incoming packet includes real-time voice or video data.

17. A method in a cable modem for ingress filtering, comprising:
   receiving programming from a remotely located cable modem termination system (CMTS) to program an inspection engine of a Media Access Control (MAC) of the cable modem to determine a priority level of a packet;
   receiving the packet;
   parsing the packet in the inspection engine to determine the priority level of the packet;

determining whether a buffer is available in a buffer pool to store the packet, wherein the buffer pool is external to the MAC; and allocating the buffer to store the packet based on the priority level of the packet.

18. A cable modem, comprising:
a buffer pool, including a plurality of buffers, configured to store packets; and a Media Access Control (MAC) external to and coupled to the buffer pool and configured:

to be programmed remotely by a Cable Modem Termination System (CMTS) to determine a priority level of an incoming packet, to parse the incoming packet to determine a priority level of the incoming packet, to determine whether a buffer of the plurality of buffers is available to store the incoming packet, and to allocate the buffer to store the incoming packet based on the priority level of the incoming packet.

19. The cable modem of claim 18, wherein the buffer pool further comprises:
a buffer manager configured to send a queue status signal to the MAC to indicate availability of the buffer.

20. The cable modem of claim 18, wherein the MAC is further configured to send a signal to discard a lower priority packet stored in the buffer if the incoming packet is a higher priority packet and the queue status signal indicates that no buffer in the plurality of buffers is available to store the higher priority packet.

* * * * *

UNITED STATES PATENT AND TRADEMARK OFFICE
CERTIFICATE OF CORRECTION

| | |
|---|---|
| PATENT NO. | : 9,917,779 B2 |
| APPLICATION NO. | : 13/435674 |
| DATED | : March 13, 2018 |
| INVENTOR(S) | : David Pullen |

It is certified that error appears in the above-identified patent and that said Letters Patent is hereby corrected as shown below:

In the Specification

In Column 3, Line 13, replace "13a-n" with --138a-n--.

In Column 4, Line 4, replace "(WAN" with --(WAN)--.

Signed and Sealed this
Eighteenth Day of June, 2019

Andrei Iancu
*Director of the United States Patent and Trademark Office*